United States Patent [19]
Elsdoerfer

[11] 3,845,561
[45] Nov. 5, 1974

[54] MEASURING HEAD SYSTEM

[76] Inventor: Waldemar J. Elsdoerfer, 235 Love Ln., Warwick, R.I. 02886

[22] Filed: June 5, 1972

[21] Appl. No.: 259,734

[52] U.S. Cl. ........... 33/169 R, 33/172 E, 33/174 Q, 33/174 L, 33/DIG. 2, 33/DIG. 6
[51] Int. Cl. ............................................. G01b 5/04
[58] Field of Search .......... 33/169 R, 169 C, 172 R, 33/172 B, 172 E, 174 Q, 174 L, 174 R, 174 PC, 172 D, 147 L, DIG. 2, DIG. 6, 27 K

[56] References Cited
UNITED STATES PATENTS

| | | | |
|---|---|---|---|
| 1,580,081 | 4/1926 | Wickman | 33/179.5 R |
| 2,197,198 | 4/1940 | Street | 33/178 R |
| 2,240,184 | 4/1941 | Hathaway | 33/147 N |
| 2,559,575 | 7/1951 | Fryklund et al. | 33/23 H |
| 2,766,003 | 10/1956 | Dall et al. | 33/23 K |
| 2,952,918 | 9/1960 | Eickman | 33/169 R |
| 3,193,937 | 7/1965 | Aller | 33/172 E |

FOREIGN PATENTS OR APPLICATIONS

| | | | |
|---|---|---|---|
| 801,412 | 1/1951 | Germany | 33/172 R |

OTHER PUBLICATIONS

Mueller, Paul M., "Air Lubricated Bearings," Product Engineering, p. 112–115, August 1951.

*Primary Examiner*—Louis R. Prince
*Assistant Examiner*—Richard R. Stearns
*Attorney, Agent, or Firm*—Dike, Bronstein, Roberts, Cushman & Pfund

[57] ABSTRACT

A measuring head system for a measuring machine, the system includes a parallelogram assembly suspended on four leaf springs which supports a sensing assembly and which includes in the preferred construction, a probe having a rotating needle. In addition there is provided an adjustable damping mechanism to counteract the vibration of the springs.

1 Claim, 11 Drawing Figures

PATENTED NOV 5 1974 3,845,561

MEASURING HEAD SYSTEM

The present invention is particularly useful for measuring the geometry and surface conditions of workpieces such as pistons, cams, cylinders, etc.

BACKGROUND OF THE DISCLOSURE

This invention relates to systems useful in the inspection of machine parts to determine the accuracy of the parts and more particularly to new and improved measuring head or probe systems for checking machine part geometry and surface conditions, as for example, the interior or outside diameter of a cylindrical component such as an engine head or a cam.

Over many years there have been developed many devices for measuring the geometry of surfaces. Indicating gages of various types such as dial gages and fluid gages as well as templates have been used for these purposes. Although these devices are quite acceptable for certain purposes e.g., where extremely high accuracy is not required, they are not able to provide measurement capability where extremely high accuracy is required under dynamic conditions such as encountered in a totally automatically controlled measuring system.

In addition, the gages of the prior art do not lend themselves to use as part of an automated inspection system and their use entails many hours of tedious labor to generate information concerning the surface condition of a workpiece.

In view of the foregoing, there has developed the need for a new and improved probe system, particularly one which is adaptable for universal use in conjunction with data processing equipment or the like and which is capable of providing ultra precise measurements in comparison with the measuring devices of the prior art.

SUMMARY OF THE DISCLOSURE

The present invention is suitable for use as the head of a universal measuring machine as well as in a machine to control the operation of machine tools.

The head comprises in the preferred embodiment a housing, a transducer which is controlled by a sensing assembly and a parallelogram assembly suspended on four leaf springs which support the sensing assembly. The sensing assembly includes a probe holder which can accept various probes. As two features of the preferred embodiment, there is provided a probe which includes a rotating needle having a spherical tip as well as a new and improved fluidic means for controllably damping the spring system supporting the probe.

DESCRIPTION OF THE PREFERRED EMBODIMENTS

Figure 1:
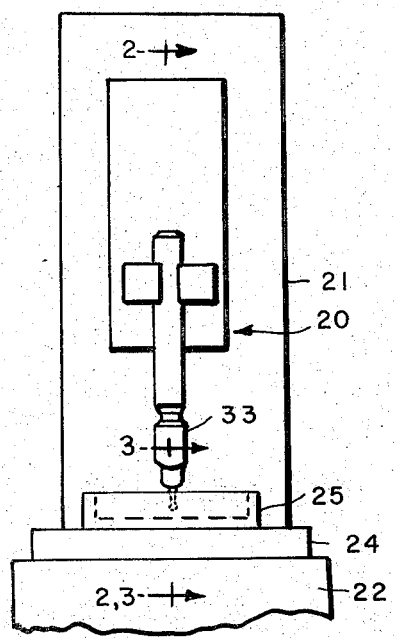
FIG. 1 is a front view of the head according to the invention with the probe thereof in position to measure the internal diameter of a workpiece.
Figure 3:
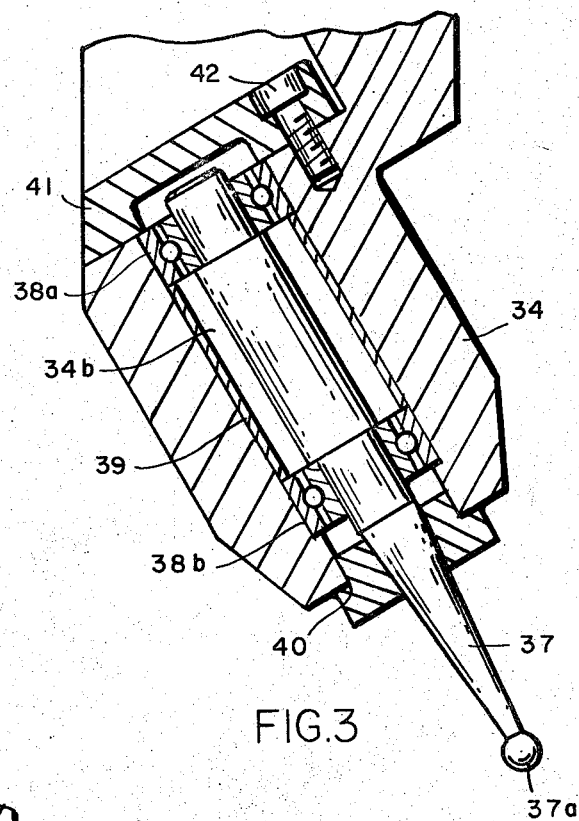
FIG. 3 is a sectional view taken along line 3—3 of FIG. 1.

Reference should now be had to FIGS. 1-9 for a description of the preferred embodiments of the invention and in particular to FIG. 1 for a description of the setting for the invention.

In FIG. 1 there is shown at 20 the measuring head of the invention. The measuring head is supported in a conventional manner by a frame 21 of the measuring machine which may be movable over rails (not shown) or the like supported by a base 22. The measuring head 20 is also preferably mounted for vertical adjustment by the provision of a conventional carriage (not shown).

Since the vertical adjustment of the head forms no part of this present invention it will not be described in further detail.

The base 22 as shown supports a table 24 on which there is positioned a workpiece 25 to be gaged.

In the preferred mode of operation, the table 24 is rotated so that the sensing portion of the head 20 may engage the inside side surface of the cylindrical bore shown formed on the workpiece.

Reference should now be had to FIGS. 2-9 in conjunction with FIG. 1 for a detailed description of the head 20. The head 20 comprises a sensing assembly 30 which through a probe holder 31 coupled thereto and having spring loaded clamping members 32, supports a probe shown at 33.

The probe 33 comprises a housing or shaft 34 which is provided with accurately machined V-shaped flats shown at 35 which seat against corresponding V-shaped flats 36 provided in the probe holder 31 thus orienting the probe with respect to the workpiece.

The probe housing 34 has a lower portion provided with a cavity 34b (a bore and counter-bore as shown) in which there is positioned a needle 37 having a spherical tip or point 37a at the bottom thereof. Within the cavity there are provided contact bearings 38a and 38b (in this case radial bearings as shown) which support for free rotation the needle 37. The bearings 38a and 38b are separated from each other by a cylindrical liner (spacer) 39.

At 40 there is shown a dust shield for preventing dirt from penetrating into the bearings and may be a rubber structure press fitted into the housing 34.

In addition, at 41 there is provided a needle cap having the requisite clearance for needle rotation and which is coupled to the housing by a screw 42.

Reference should now be more particularly directed to FIGS. 2, and 4-8 for a description of the sensing assembly 30 which in turn is supported by a support structure 45 such as a parallelogram assembly which is suspended by a spring system preferably comprising four leaf springs 47.

The leaf springs 47 are secured to a base member 49 which in turn is coupled to an end plate 50. The end plate 50 is coupled as shown to a probe base 51 supported by a Y-axis tongue 52 mounted in a dovetail base 53 which in turn is supported by an X-axis tongue 54.

Since the members 52-54 form no part of the invention and are in fact conventional no further explanation will be given. In addition, side cover plates 55 and 56 are coupled to the probe base 51 and base member 49.

Figure 2:
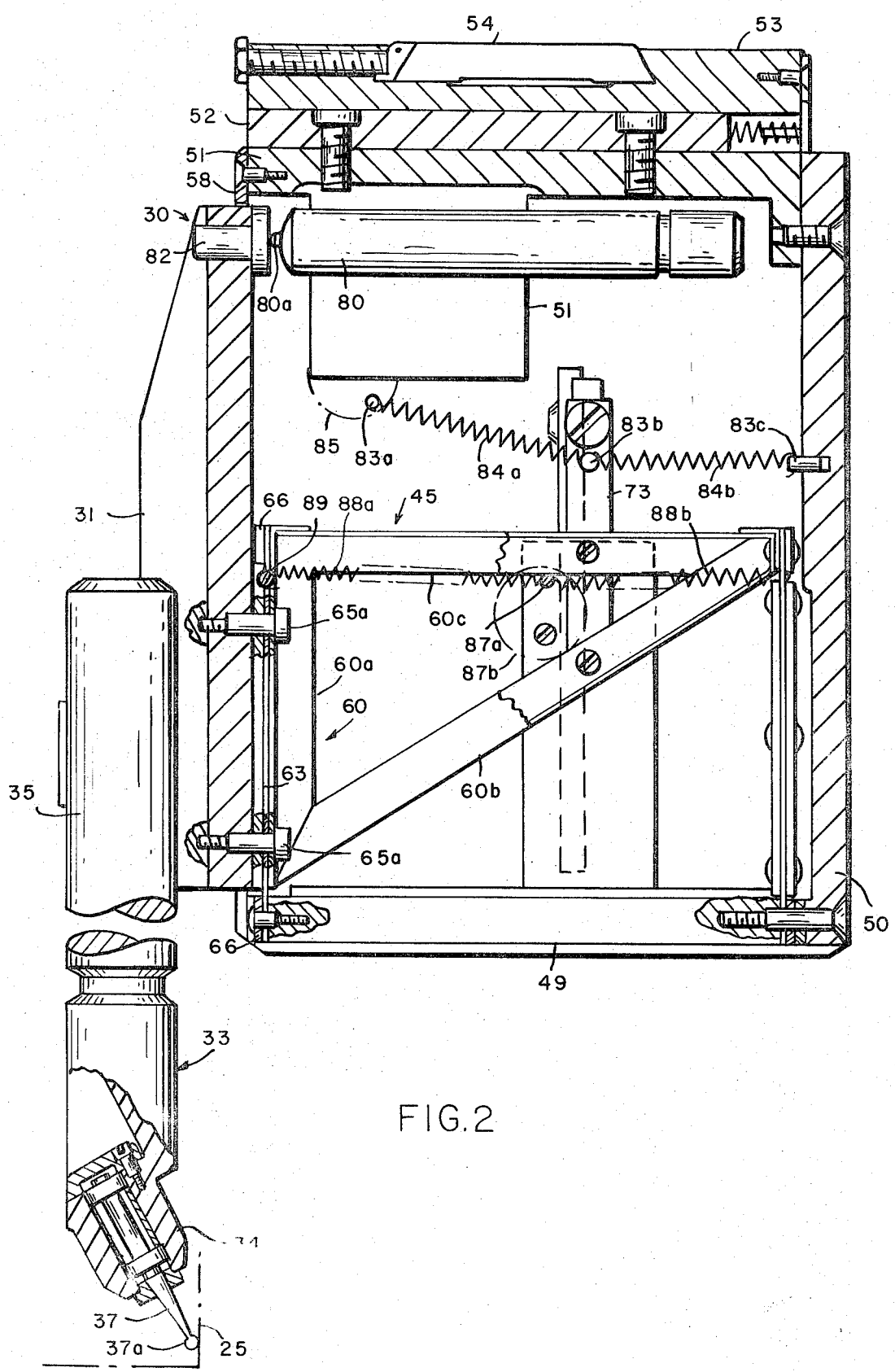
FIG. 2 is a sectional view taken along line 2—2 of FIG. 1 with side covers removed.

Furthermore, bottom cover 57 is provided which is coupled to the member 49 and front cover 58 is coupled as shown in FIG. 2. The parallelogram assembly 45 comprises two triangular frame members 60, comprising parts 60a, 60b and 60c (e.g. welded together). Each parallelogram assembly 60 is supported at 61 by rivets coupling members 60b and 60c via rear plate 62 to rear springs 47. In addition, each of the rear springs 47 are coupled to rear plate 62 which extends between the rear springs 47 and each of the leaf springs is provided with stiffener bars 63.

At the front thereof (left of FIGS. 2, 5 and 6), each parallelogram has members 60a coupled to a shin plate 67 and front plate 64, all of which are then being coupled together through rivets 65. The probe holder 31 is coupled to plate 64 by screws 65a.

Figure 6:
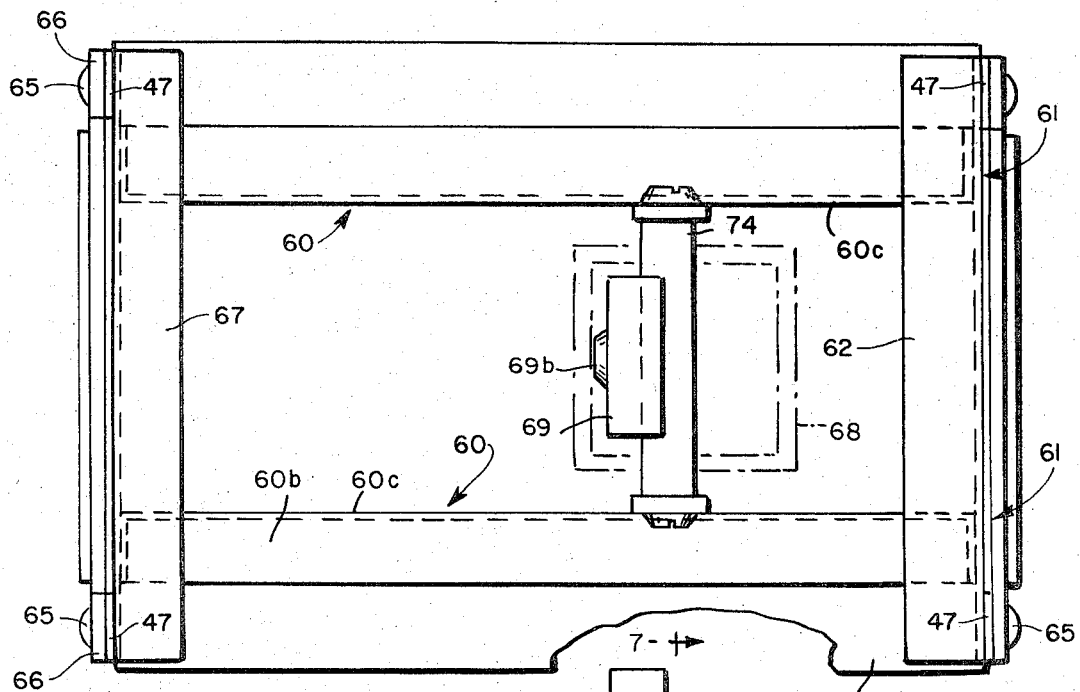
FIG. 6 is a top view of FIG. 5.
Figure 5:
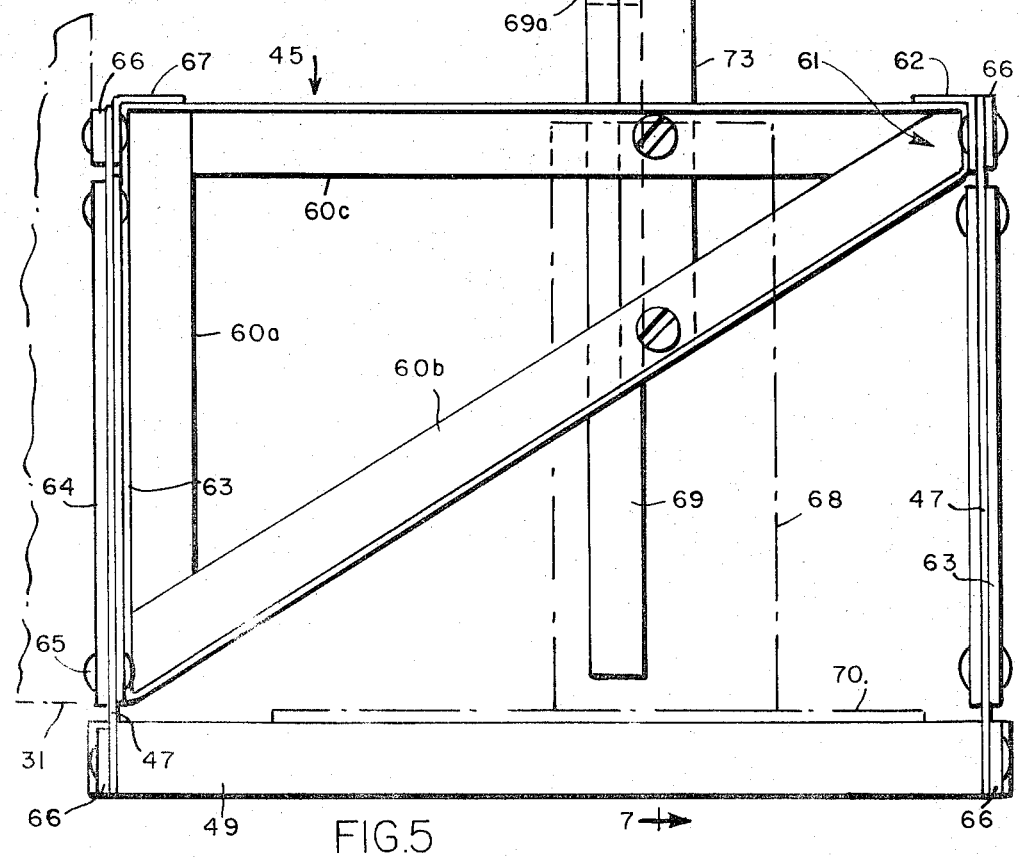
FIG. 5 is an enlarged side view of the probe support assembly of FIG. 2 showing in detail the fluidics damping mechanism of the invention.

As shown in FIGS. 2, 5 and 6, stiffener pads 66 are provided for the purpose of providing stiffness to the springs 47.

In order to retain the flexibility and sensitivity of the combination parallelogram assembly-probe and still dampen the spring system thereof, there is incorporated as an important feature hereof a new and improved fluidic damping mechanism as part of the measuring head.

The fluidic damping device as disclosed and shown in FIGS. 2, and 4-8 herein acts as a flow restricting apparatus. The device includes two primary components, a reservoir at 68 and a restrictor or baffle at 69. The reservoir is open at the top and is coupled to a base plate 70 secured (e.g., by welding) to the member 49.

Figure 7:
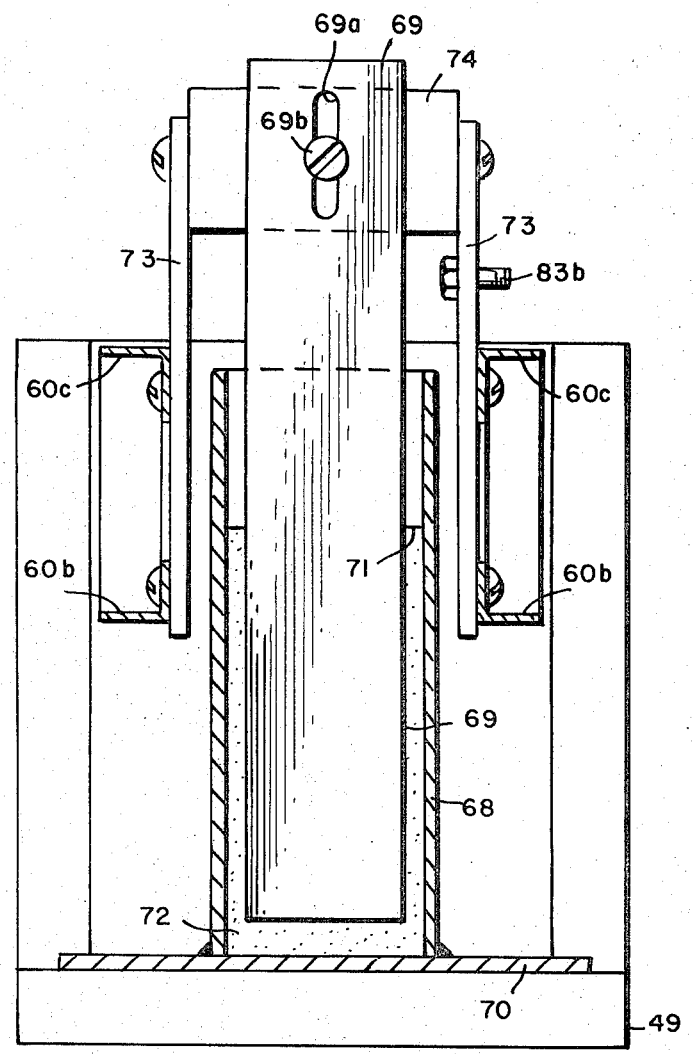
FIG. 7 is a sectional view taken along line 7—7 of FIG. 5.
Figure 9:
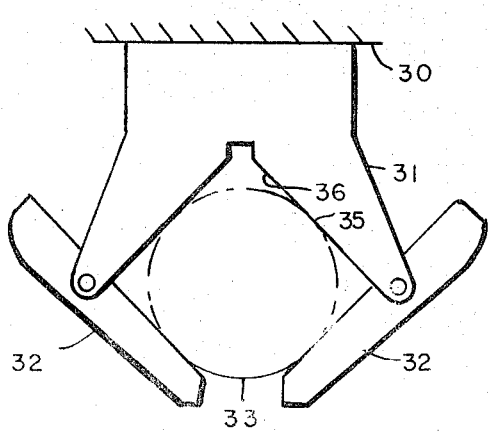
FIG. 9 is a top view of the probe support.
Figure 8:
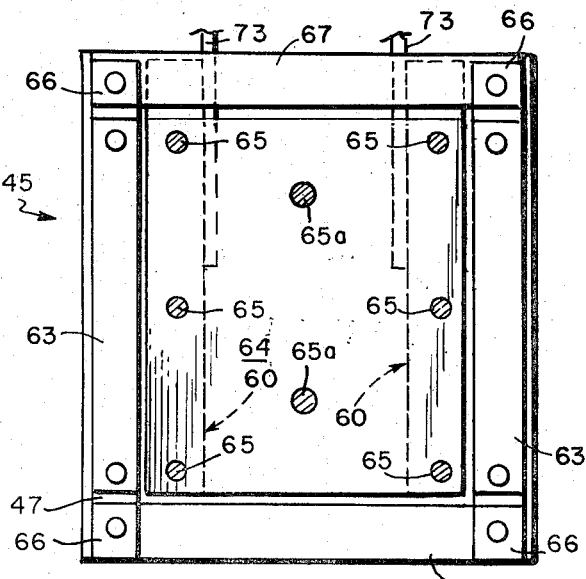
FIG. 8 is a front view taken at the left of FIG. 5.

The restrictor is positioned to extend into the inner confines (between the inner wall thereof) of the reservoir 68 and below the level 71 of a fluid 72 (e.g., oil) shown stippled in FIG. 7. The restrictor 69 is supported by upright members 72 coupled by screws as shown to frame members 60b and 60c which in turn support crossbar member 74 as shown by screws. The restrictor 69 is provided with a vertical slot 69a and a set screw 69b to permit vertical adjustability of the restrictor 69.

In this manner the damping characteristics of the head may be controlled to adjust for probes of different mass without upsetting the equilibrium of the system.

The restrictor of the system in a sense acts as a paddle which moves back and forth within a well and thus dampens the spring system. In addition, it should be realized that the nature and properties of the fluid 72 selected will also effect the damping of the system as will the shape of the restrictor penetrating into the reservoir.

For example, the restrictor may be constructed with holes therethrough to permit the flow of fluid therethrough or may be shaped to permit it to more easily pass through the fluid.

All of these possibilities are considered to be a part of this invention as long as the restrictor functions to provide spring system damping.

Figure 4:
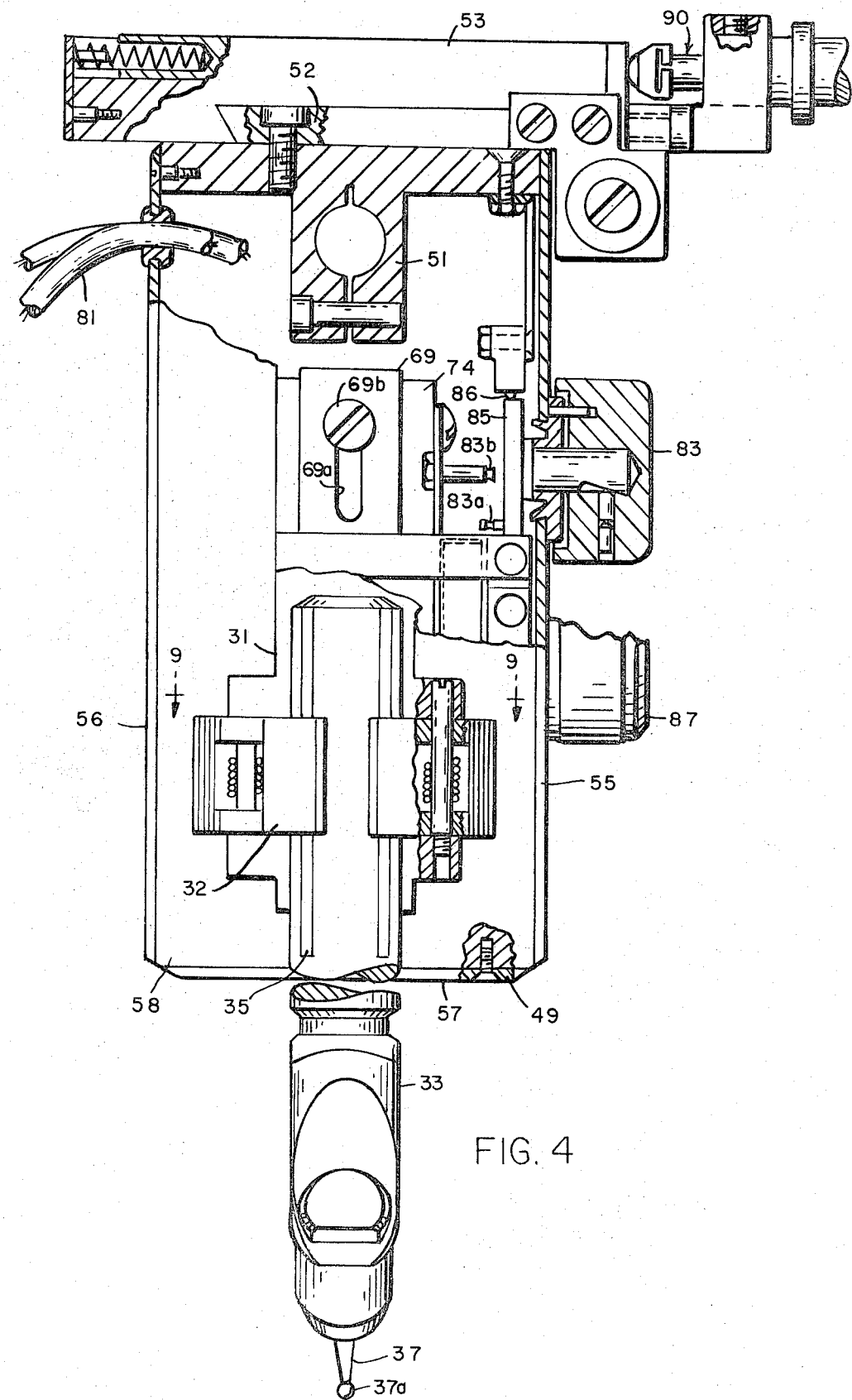
FIG. 4 is an enlarged front view of the head according to the invention with parts removed and with parts sectioned.

Reference should now briefly be had to FIGS. 2 and 4 which disclose some of the moving parts of the machine for actuating a transducer 80 coupled to electrical cable 81 and positioned in member 51.

The transducer 80 may be the type which produces a change in frequency with change in displacement of the tip 80a thereof by a button 82 supported by member 31. The transducer such as the above mentioned type may be purchased from Brown and Sharp, Industrial Products Division, North Kingston, Rhode Island under Catalog No. 599-983 shown in CAT. STM-5.

In addition, as shown in FIGS. 2 and 4 there is provided a selector knob 83 rotatable between two positions and coupled to spring 84a via pin 83a mounted on cam 85 (shown in phantom) and also to member 83b.

Another spring 84b is also coupled to the pin 83b (on member 73) and to end holder 83c as shown in FIG. 2. The cam 85 engages an electrical mode switch 86 to indicate if the internal diameter or external diameter of the workpiece is being scanned. This information is used in a computation apparatus attached to the head and since it forms no part of the invention, it will not be discussed any further. The measuring mode (ID or OD) is made directionally sensitive by pulling the frame to the left or right of FIG. 2 depending upon whether ID or OD (outside diameter) is being measured. For OD measurement of a workpiece the assembly 60 is pulled to the left and vice versa for ID measurement thus initially locating the probe tip 80a.

At 87 in the drawings, FIGS. 2 and 4, there is provided a further control knob which has attached to it a disc 87b (shown in phantom) having an eccentrically located pin 87a (in phantom) coupled thereto and which has springs 88a and 88b wrapped around it at one end.

The spring 88a is coupled to a pin 89 supported by the frame member 60 while spring 88b is coupled at its other end into a hole (not shown) of frame member 60b. By rotation of the pin 87a, measuring pressure is adjustable in a conventional manner.

At 90 there is shown a conventional micrometer for setting the location of the head.

Figure 10:
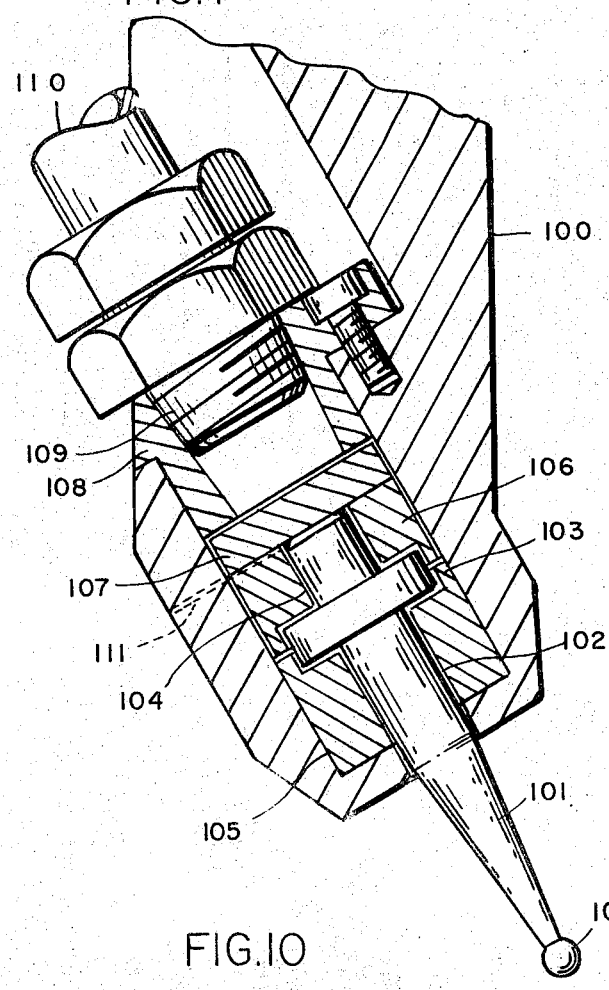
FIG. 10 is a sectional view of an aerostatic probe.

Reference should now be had to FIG. 10 which illustrates an air bearing probe with a rotating tip which may be used in place of the contact radial bearing as disclosed in the probe of FIGS. 1-9. It should also be understood that contact bearings include for the purpose of this invention bearings such as plane, roller, ball etc. The air bearing probe as disclosed is directly placeable within the probe holder of 31 shown in FIGS. 1, 2, 4 and 9.

Contact bearing probes suffer at least to some extent in eccentricity and roundness and accordingly some error tends to find its way into any measurement. Although such contact probes are indeed quite acceptable, rotating air bearing probes provide the advantages of about one magnitude increase in accuracy.

As shown in FIG. 10, the air bearing probe includes a housing 100 in which there is supported for rotation a needle 101 (rotor) having a tip 101a (preferably spherically shaped). The needle 101 has portions 102, 103 and 104 positioned between stationary members (stators) 105, 106 and 107. Air is provided at, for example, 80 psi through a hose 110 threaded at 109 into a cap 108. Air is fed between the clearances shown between the parts to float the needle for free rotation and escape channels 111 are provided.

Figure 11:
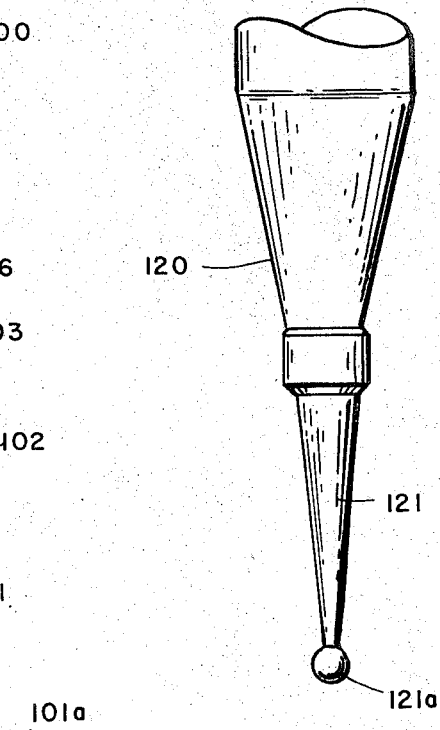
FIG. 11 is a view showing a probe having a stationary needle which may be used in limited instances.

Referance should now be had to FIG. 11 which illustrates at 120 a solid non-rotating probe which can, where extreme accuracy is not important, be used and mounted in the probe holder 31. The probe 120 includes a tip 121 having a scribe point 121a.

Although this type of probe may be used in limited cases in conjunction with the measuring head it should be realized that it does not provide the advantages of the rotating probe disclosed as one of the important features of this invention.

With the rotating probe it is possible to substantially reduce distortion of the measuring instrument and to also insure that the test workpiece contour is not changed as it is being measured. The above can not be said for a fixed probe which will cause a scribe or wear line (however faint) to be made in the workpiece thus introducing errors in measurement as well as causing possible damage to the workpiece.

With the freely rotating probe of this invention the above has in fact been virtually eliminated.

In operation, the measuring head of this invention is positioned so that the probe and its needle tip (e.g., 37a) is positioned to contact the workpiece surface to be gaged. Thereafter the tip is moved relative to the workpiece thus causing the needle to rotate within its bearings (in the case of needles 37 or 101).

As the needle rotates it also moves or rocks back and forth depending on the surface to cause the member 82 to apply more or less force to the transducer tip 80a thus causing a change in the electrical output of the transducer representing the measurement being made. The electrical change may be a voltage amplitude change, frequency, phase change, etc., depending upon the transducer used. With the probe of FIG. 11, the above also takes place except for the rotation of the needle.

I claim:

1. In a measuring head apparatus for the inspection of machine parts which includes a sensing assembly having a probe for engaging a workpiece to be measured by moving relative thereto, a base, a parallelogram assembly including a leaf spring system which is supported by the base, and a plurality of support members coupled to the spring system, said support members supporting the sensing assembly therefrom, the improvement comprising fluidic damping means which includes a reservoir supported by the base means, a restrictor supported by the parallelogram assembly support members and which has a portion thereof which extends into the reservoir and moves therein as a paddle with the motion of the parallelogram assembly and the probe, said reservoir containing fluid and said restrictor extending below the level of said fluid, and adjustable means coupling the restrictor to said parallelogram assembly to adjust the extent to which the restrictor extends into the fluid in the reservoir.

* * * * *